Figure 1:
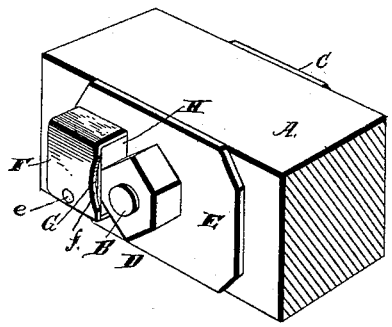

(No Model.)

D. W. THROCKMORTON.
NUT LOCK.

No. 392,702. Patented Nov. 13, 1888.

Witnesses
Geo. G. Thorpe
Theodore S. West

Inventor,
David W. Throckmorton,
By his Attorneys,
C. A. Snow & Co.

N. PETERS. Photo-Lithographer. Washington. D. C.

UNITED STATES PATENT OFFICE.

DAVID W. THROCKMORTON, OF MARTINSBURG, WEST VIRGINIA.

NUT-LOCK.

SPECIFICATION forming part of Letters Patent No. 392,702, dated November 13, 1888.

Application filed April 16, 1888. Serial No. 270,805. (No model.)

*To all whom it may concern:*

Be it known that I, DAVID W. THROCKMORTON, a citizen of the United States, residing at Martinsburg, in the county of Berkeley and State of West Virginia, have invented a new and useful Improvement in Nut-Locks, of which the following is a specification.

My invention relates to improvements in nut-locks; and it consists in the construction and novel combination of parts hereinafter described, illustrated in the drawings, and pointed out in the claims hereto appended.

Figure 2:
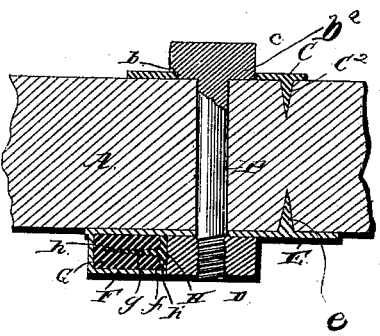
Figure 3:
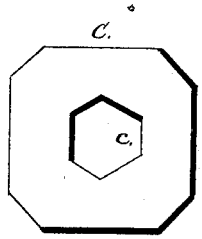
Figure 4:
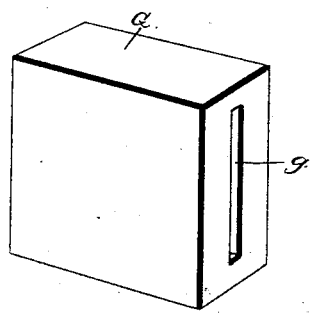
Figure 5:
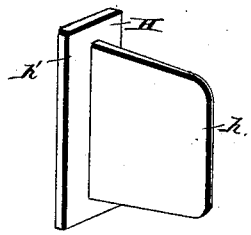
Figure 6:
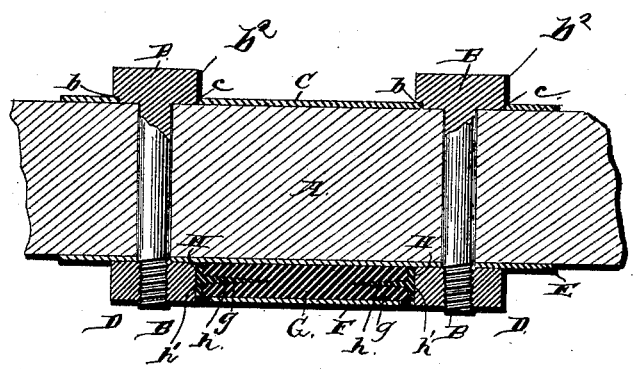

Figure 1 of the drawings represents a perspective view of a beam having attached a nut-lock that embodies the invention. Fig. 2 is a horizontal section of the same to show the shoulder in the bolt-head. Fig. 3 is a plan view of the bolt-head washer or retaining-plate detached. Fig. 4 is a perspective view of the block rubber cushion detached. Fig. 5 is a perspective view of the dog detached. Fig. 6 is a horizontal longitudinal section of a modification of the device in which two bolts are used. Fig. 7 is a detail perspective view of the bolt, showing the inner side of the head thereof.

Referring to the drawings by letter, A designates a beam, and B a bolt, the angular head of which is provided on its inner side with an angular projection or offset, $b^2$, which conforms to the shape of the head, and all the sides of the projection or offset, with one exception, are flush with the corresponding sides of the head. The remaining side of the projection or offset is set back from the corresponding side of the head to form a shoulder, $b$, which is preferably parallel with the said side of the head.

C represents a washer or retaining-plate, provided with an angular opening, $c$, conforming in contour to the projection or offset $b^2$ on the bolt-head, and adapted to receive the said projection or offset, and thus prevent the bolt from turning. The shoulder $b$ on one side of the projection or offset bears on the washer-plate C and prevents the bolt-head from passing through the opening $c$.

$C^2$ is a pin on the inner face of the washer C, that enters a recess in the beam and prevents the washer from turning. D is the nut on the opposite side of the beam, and of ordinary construction.

E is the nut washer or retaining-plate, also having on its inner face a pin, $e$, which enters a corresponding recess in the beam to prevent said washer from turning.

The washer E has formed upon its outer face, adjoining the end farthest from the bolt-opening, a box or casing, F, preferably rectangular in shape and closed on all sides except that facing the nut, into which open end is inserted a rubber block, elastic cushion, or spring, G, that fits within the casing, the edge of the roof of which is made concave at $f$ over the end of the rubber block, to permit the nut to be turned. The end of the rubber block facing the nut is provided with a deep central slit or narrow recess, $g$, which extends longitudinally parallel to the faces of the block and receives the flange $h$ of the dog H, which consists of said flange and the plate $h'$, secured at right angles to the end of the flange facing the nut, lying against the adjacent end of the rubber block, and forced thereby against the nut, so that the latter cannot turn accidentally, but can be turned by means of a suitable wrench. By the use of said wrench the dog is forced inward in the casing and the rubber block compressed. The concave edge $f$ permits the corners of the nut to pass the casing. The bolt is thus prevented from turning in the nut by its washer C, and the nut is prevented from turning on the bolt by the washer E, the rubber block G, and the dog H.

Fig. 6 shows a modification, in which two similar nuts are locked on corresponding bolts. In this modification the washers C and E do not need to have pins on their inner faces, as the two bolts prevent them from turning. The casing F in said modification is central on the washer E, and is open at both ends, as two rubber blocks and two dogs are used, which, respectively, lock the nuts at the opposite ends of the washer E. This modification is particularly adapted to be used upon rail-joints, as the washers C and E lie flat against the fish-plates, which need have no pin-recesses in them.

Having described my invention, I claim—

1. In a nut-lock, the combination of a stationary washer, E, arranged under the nut and provided with a casing, F, having an open side facing the nut, the elastic block arranged in the casing, and the plate $h'$ in contact with the exposed face of the block and held thereby in contact with one side of the nut, substantially as specified.

2. In a nut-lock, the combination, with a nut and washer, of the casing F, arranged on the washer with an open side facing the nut, and the flat plate sliding in the casing and held in contact with one side of the nut by a suitable spring within the casing, substantially as specified.

3. In a nut-lock, the combination, with a nut and washer, of the casing F, arranged on the washer adjacent to the nut, the rubber block G, disposed in the casing and provided with a slit, $g$, and the dog H, comprising the plate $h'$, fitting snugly in the casing in contact with the block G, and the flange $h$, fitting in the said slit in the block, substantially as and for the purpose specified.

In testimony that I claim the foregoing as my own I have hereto affixed my signature in presence of two witnesses.

DAVID W. THROCKMORTON.

Witnesses:
J. H. SIGGERS,
E. G. SIGGERS.